United States Patent
Hoffbeck et al.

(10) Patent No.: US 6,445,686 B1
(45) Date of Patent: Sep. 3, 2002

(54) METHOD AND APPARATUS FOR IMPROVING THE QUALITY OF SPEECH SIGNALS TRANSMITTED OVER WIRELESS COMMUNICATION FACILITIES

(75) Inventors: Joseph P. Hoffbeck, Portland, OR (US); Martin Howard Meyers, Montclair, NJ (US); Al-Nasir A. Premji, St. Catharines (CA); Ahmed A. Tarraf, Bayonne; Kevin G. Tracy, Long Valley, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/146,788

(22) Filed: Sep. 3, 1998

(51) Int. Cl.[7] .............................................. H04B 7/216
(52) U.S. Cl. ........................ 370/318; 370/342; 455/522
(58) Field of Search .................................. 370/310, 318, 370/328, 342, 350, 332, 333, 349, 335, 441, 394; 704/228, 219, 220, 214, 215; 455/403, 226, 522, 13.4; 709/746–751

(56) References Cited

U.S. PATENT DOCUMENTS

| | | | | | |
|---|---|---|---|---|---|
| 4,309,764 | A | * | 1/1982 | Acampora | 370/318 |
| 5,289,501 | A | * | 2/1994 | Seshadri et al. | 375/286 |
| 5,384,793 | A | * | 1/1995 | Zinser | 417/822 |
| 5,450,449 | A | * | 9/1995 | Kroon | 375/350 |
| 5,671,156 | A | * | 9/1997 | Weerackody et al. | 714/52 |
| 5,710,781 | A | * | 1/1998 | Zinser et al. | 714/747 |
| 5,822,318 | A | * | 10/1998 | Tiedemann, Jr. et al. | 370/391 |
| 5,884,010 | A | * | 3/1999 | Chen et al. | 359/2.37 |
| 6,044,073 | A | * | 3/2000 | Seshdri et al. | 370/342 |
| 6,084,641 | A | * | 7/2000 | Wu | 348/722 |
| 6,115,689 | A | * | 9/2000 | Malvar | 704/503 |

* cited by examiner

Primary Examiner—Ajit Patel
Assistant Examiner—Saba Tsegaye
(74) Attorney, Agent, or Firm—Stephen M. Gurey

(57) ABSTRACT

It has been recognized that in a wireless communication system certain frames of encoded speech data transmitted between a base station and a mobile unit, or between a mobile unit and a base station, are more critical than others. A frame may be determined to be erased by the receiving base station or mobile unit due to noise or interference over the wireless transmission medium. If an erased frame cannot be recreated from one or more preceding frames, then it is more critical than a frame that can be recreated by an extrapolation of data from one or more preceding frames. Accordingly, on a frame-by-frame basis, each frame in a sequence of frames is identified as being critical or non-critical. Each frame that is identified as being critical is then transmitted in a manner that is more robust than the manner in which non-critical frames are transmitted to decrease the likelihood that a receiver will determine that the frame is erased. In a CDMA system, a current frame is identified as being critical by forming a weighted sum of the differences between corresponding frame parameters that represent the current frame and frame parameters that represent a previous frame. That weighted sum is compared with a threshold. If the weighted sum exceeds the threshold, then the current frame is classified as being a critical frame and is transmitted at a higher output level than non-critical frames are transmitted.

32 Claims, 1 Drawing Sheet

METHOD AND APPARATUS FOR IMPROVING THE QUALITY OF SPEECH SIGNALS TRANSMITTED OVER WIRELESS COMMUNICATION FACILITIES

FIELD OF THE INVENTION

This invention relates to wireless communications, and more particularly, to a method and apparatus for improving the quality of speech signals transmitted over a wireless communications system.

BACKGROUND OF THE INVENTION

In order to maximize use of the limited available bandwidth for wireless communication services, various compression techniques and multiplexing techniques are used on the link between a base station, which is connected to a wireline telecommunications network, and a plurality of different users at mobile units each of whom are simultaneously communicating, via that base station, with other users who may be connected to either a wired or wireless network. Time Division Multiple Access (TDMA) and Code Division Multiple Access (CDMA) are examples of two well known multiplexing schemes used in wireless cellular and PCS systems. In TDMA, a time frame is subdivided into a plurality of time slots and a user's mobile unit communicates in burst transmissions over a specific time slot at uplink and downlink carrier frequencies associated with the base station, which time slot assignment is made when a call commences. A receiver at a base station time-division multiplexes the plural digital speech signals directed to the plural mobile units into a downlink signal which is transmitted at a downlink carrier frequency to the mobile units. The receiver in each mobile unit then recovers the digital speech signal directed to itself in accordance with the time slot assigned to that mobile unit. Similarly, the uplink signal transmitted by each mobile unit is transmitted in an assigned time-slot, which time-slot assignment is used by the base station to appropriately recover the digital speech signal transmitted by the mobile unit. In CDMA, rather than assigning a mobile unit a specific time slot, a mobile unit is assigned a specific encryption code which is used to spread the spectrum of the coded speech signal over the channel. The plural mobile units that are simultaneously communicating with the base station are each assigned a different encryption/decryption code. The codes associated with each mobile unit are then used by the base station to multiplex the plural digital input speech signals into a downlink signal which is transmitted to all the mobile units. The mobile unit set then uses its associated decryption code to recover the particular digital speech signal directed to it from the multiplexed downlink signal transmitted by the base station. Uplink communication from the plural mobile units functions in a parallel manner.

In order to reduce the number of bits representing the coded digital speech signal, and therefore improve the efficiency of use of the available frequency bandwidth, speech compression techniques are used in wireless communication. The analog speech signal, which is normally sampled at, for example, an 8 kHz rate to produce a PCM bit stream, is subdivided into frames and compressed using an appropriate coding algorithm. In TDMA systems, a fixed rate vocoder, such as an ACELP (Algebraic Code Excited Linear Predictive) or VCELP (Vector-Sum CELP) coder, is used to compress the PCM samples. In CDMA systems, a variable rate CELP algorithm is used. Specifically, for CDMA, a speech encoder produces a variable rate output based on the speech activity of the input speech signal. During active speech periods, the speech encoder produces full rate 20 ms frames. During the silent periods, the speech encoder produces ⅛ rate frames. During transition periods between the talking periods and silent periods, the speech encoder produces ½ rate and ¼ rate frames. During these sub-rate frames, power consumption is reduced to a lower level than during full rate frames advantageously reducing the overall power output.

In the CDMA transmitter at either the mobile unit or at the base station, the PCM speech samples are broken down into 20 ms frames. The speech encoder uses an analysis-by-synthesis method to optimally determine the parameters for a given PCM speech frame input. For every 20 ms PCM speech frame input, the speech encoder produces a set of output parameters that represent the encoded frame. The speech encoder determines that set as a set of input parameters for an internal-to-the-encoder decoder, which minimizes the perceptual difference between the synthesized speech, which is output from the internal decoder, and the original input speech. An encoded full rate frame includes the following parameters: the linear predicative coding (LPC) parameters; pitch lag (L) and pitch gain (b) parameters; and codebook gain (G) and codebook index (I) parameters. At the receiving end, at the mobile unit or at the base station, the speech decoder receives each incoming encoded frame and converts each frame back into a sequence of PCM speech samples using the encoded frame. (see, e.g., TIA [Telecommunications Industry Association] IS-733-High-Rate [13 k] bits per second Speech Service Option).

As a consequence of the susceptibility of wireless links to interference and other inherent atmospheric conditions, a transmitted frame may not reach the receiver at either the base station or mobile unit set or may be severely corrupted by noise or interference. When a frame is "lost" or is so corrupted with noise or interference as to be undecodable, it is marked by the receiver as being erased and no encoded parameters are supplied to the speech decoder. In order to minimize the perceptual effect of such an erased frame, a Frame Masking Algorithm is used to estimate the PCM samples for the erased frame using an extrapolation of the data from a previous frame. Thus, the speech decoder uses the previous values of the aforedescribed frame parameters to determine the current values of the erased frame. More specifically, for CDMA 13 k systems, the current values of the linear predictive coding (LPC) parameters are determined by decaying the LPC parameters of the previous frame, where the decaying coefficient is a function of the number of consecutive erasure frames. The current value of the pitch gain lag (L) is repeated from the previous frame; the current value of the pitch gain (b) is determined from the pitch gain of the last frame; the current value of the codebook gain (G) is determined by subtracting an appropriate integer from the previous value of G; and the codebook index (I) is determined randomly. A problem arises, however, when the previous frame to an erased frame is less than a full rate frame. When the previous frame is, for example, a ⅛ rate frame, the resultant perceptive speech quality obtained by extrapolating parameters from the ⅛ rate frame is poor.

In the prior art, the power of the signals transmitted on the downlink from the base station to the mobile unit set and on the uplink from the mobile unit to the base station is controlled to minimize power while maintaining an acceptable frame error rate. In particular, on the downlink, a power control algorithm makes a decision to increase or decrease the base station transmit power based on information provided by the mobile unit on the uplink. The mobile unit monitors the downlink and compiles statistics about the downlink frame error rate. This information is then conveyed back to the base station on the uplink to enable the base station to control its transmit power to maintain the desired downlink error statistics. On the uplink, the mobile unit controls its transmit power in direct response to power control order messages sent by the base station to the mobile unit on the forward link. The uplink power control algorithm determines the required direction of uplink transmit upward or downward power change and the magnitude of the change based on the history of the received frames to date. The history of the frames received on the uplink includes good frames, corrupt frames, and frame rate information.

Disadvantageously, such prior art power control schemes increase the power transmitted by the base station and the mobile unit only after corrupted frames have been received by the mobile unit and base station, respectively.

SUMMARY OF THE INVENTION

In accordance with the present invention, it has been recognized that as a sequence of frames are transmitted from the base station to the mobile unit or from the mobile unit to the base station, certain frames are more "important" from the voice quality perspective than others and thus should be individually transmitted in a manner that will better insure their proper reception at the receiving end of the radio link. By detecting these "critical" frames and improving their robustness before they are transmitted, each such critical frame will thus be less likely to be lost or corrupted as it is transmitted over the wireless transmission channel. As an example, in a CDMA embodiment, if the parameters of the previous frames can be used by the decoder to recreate the PCM samples of the current frame without any noticeable distortion, then the current frame can be characterized as a non-critical frame. On the other hand, if the parameters of the previous frame(s) cannot be used to recreate the PCM samples of the current frame without noticeable distortion, the current frame is characterized as a critical frame. Thus, if a full rate frame follows a partial rate frame, such as a ⅛ rate frame, then that current full rate frame is identified as a critical frame before it is transmitted and its robustness is improved over non-critical frames before such a critical frame is transmitted. In an embodiment of the present invention in a CDMA system, a current frame is determined to be critical or non-critical by comparing the values of the frame parameters of the current frame with the corresponding frame parameters in a previous frame and forming a weighted sum of the corresponding differences, which is then compared with a threshold value. In this embodiment, once a frame is identified as being a critical frame, its robustness is improved by increasing its transmitted power. Thus, that critical frame, when transmitted at a higher power level, is less likely to be determined to be erased by a receiver, and more likely to reach the receiving end uncorrupted by noise. Alternative techniques for improving the robustness of a particular frame include improved channel coding that incorporate new methods of bit interleaving.

DETAILED DESCRIPTION

Figure 1:
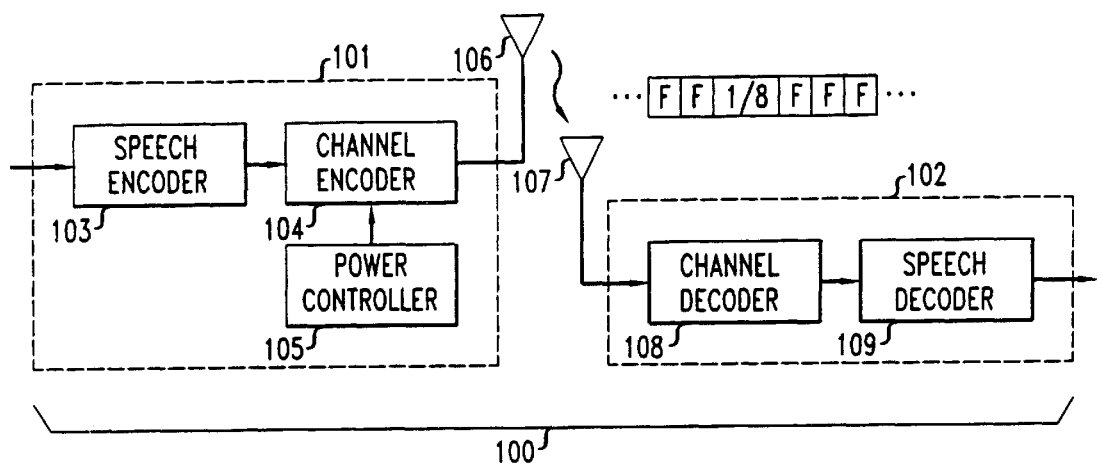
FIG. 1 is a block diagram showing the transmitter of a base station and the receiver of a mobile unit in a prior art CDMA wireless communications system.

With reference to FIG. 1, a block diagram of a prior art CDMA wireless system 100 is shown that illustrates a transmitter 101 at a base station and a receiver 102 at mobile unit. The input to a speech encoder 103 in transmitter 101 is a bit stream of PCM coded speech, which is sampled at, for example, an 8 KHz rate. Inasmuch as transmitter 101 is incorporated within a base station and wireless switch, which are connected to the Public Switched Telephone Network (PSTN) (not shown), the speech signal itself is derived from the analog-to-digital conversion of a user's speech inputted from a wired telephone set on the PSTN or a mobile set on a wireless network. Speech encoder 103 formats the PCM stream into 20 ms frames and compresses the input data using a variable rate CELP coding algorithm. During active speech periods, speech encoder 103 produces full rate frames. During silent periods, speech encoder produces ⅛ rate frames. During transition periods between the talking periods and the silent periods, speech encoder 103 produces ½ or ¼ rate frames. For every 20 ms PCM frame input, speech encoder 103 produces an encoded frame consisting of a set of output parameters. An encoded full rate frame includes the following parameters: the linear predicative coding (LPC) parameters; pitch lag (L) and pitch gain (b) parameters; and codebook gain (G) and codebook index (I) parameters.

The baseband coded frame is then converted into a radio frequency band signal by a channel encoder 104, which using well-documented CDMA technology (see, e.g., TIA IS-95B, Mobile Station—Base Station Compatibility Standard for Dual-Mode Wideband Spread Spectrum Cellular System), modulates the signal using an encryption code specifically assigned when the call was initiated. A power controller 105 controls the power output of channel encoder 104 in accordance with the rate of the frame being transmitted and the frame error rate statistics of the signal received by the receiver 102, which are returned to the base station via an uplink signal from the mobile unit to the base station. As the frame error rate (FER) increases, that FER information is returned to the base station and its power output is increased. The output signal of channel encoder 104 consists of a sequence of 20 ms frames, each frame being either a full rate frame or a sub-rate frame depending upon whether the input signal represents active speech, a silent period, or a transition period. Power controller 105 also adjusts the power output of channel encoder 104 in accordance with the rate of the frame being transmitted with the power output during a full rate frame being greater than the power output during a sub-rate frame.

The output of channel encoder 104 is transmitted via antenna 106 over the air to the mobile unit, which receives the sequential frames of compressed speech data via an antenna107. At receiver 102 in the mobile unit, a channel decoder 108 decrypts the encoded sequence of frames and demodulates the CDMA signal to a baseband sequence of parameters. Each frame of parameters is input to a speech decoder 109, which converts these parameters into a stream of PCM samples, which are decoded by digital-to-analog circuitry (not shown) into a speech signal that is audible to the user of the mobile unit.

Although not shown, it is readily apparent that the mobile unit also includes a transmitter including a speech encoder, a channel encoder and a power controller, for transmitting an uplink signal to a receiver in the base station. The latter thus also includes a receiver consisting of a channel decoder and speech decoder.

In this prior art system, when a receiver (in the mobile unit or the base station) determines that a frame is erased due to either not being received or as a result of a detected high error due to noise or interference, the decoder uses a Frame Masking Algorithm to extrapolate the current values of the received parameters from the corresponding parameters in a previous frame or frames. For example, for 13 k CDMA CELP coders, the current values of the linear predictive coding parameters (LPC) are determined by decaying the LCP of the previous frame, the decaying coefficient being a function of the number of consecutive erasure frames. The current value of the pitch lag (L) is repeated from the previous frame and the current value of the pitch gain (b) is determined from the pitch gain of the last frame. The current value of the codebook gain (G) is determined by subtracting an appropriate integer from the previous value of G and the codebook index (I) of the current frame is determined randomly.

In this prior art system, when the previous frame to an erased frame is a sub-rate frame, or when the parameters of the previous frame to an erased frame are largely different from the original parameters of the erased frame, a receiver in either the mobile unit or base station cannot extrapolate the parameter values of the erased frame from the previous frame with any degree of accuracy. The resultant speech signal is therefore poor, and may be inaudible to the receiving user.

In accordance with the present invention, it has been determined that certain frames are more important than other frames from the voice quality perspective. These "critical" frames, once identified, are then transmitted by the transmitter within the base station and/or the mobile unit in a manner that increases their robustness to noise and interference to a degree that is greater than that associated with the other non-critical frames. Thus, only those particular frames that are determined before they are transmitted to be critical are subjected to special treatment to decrease the likelihood that they will be erased. Various criteria can be used to determine whether a current frame should be classified as being a critical frame. For example, if the parameters of the previous frame or frames can be used by the speech decoder to recreate the PCM samples of the current frame without noticeable distortion, the current frame can be characterized as being a non-important frame. In this case, the current frame can be defined as a "non-critical" frame. On the other hand, if the parameters of the previous frame or frames cannot be used to recreate the PCM samples of the current frame without noticeable distortion, the current frame is characterized as a "critical" frame. For example, the full rate frame that follows a sub-rate frame in a sequence of frames is likely to be characterized as a critical frame since, as previously noted, should the receiver determine that that full rate frame is erased, it would be difficult, if not impossible, to extrapolate the parameters of that full rate frame from the previous sub-rate frame with any degree of accuracy or with any acceptable speech quality.

Once a critical frame is detected, then, in accordance with the invention, that frame is transmitted in a manner which increases its robustness to noise and interference on the wireless communication channel. In the particular preferred embodiment described herein, a critical frame is protected against channel noise, fading and interference by increasing its transmit power to a level higher than the transmit power output for non-critical frames. Thus, with its increased transmit power, the critical frame is less likely to be erased by a decoder at the receiver. Further, by increasing the power output of only those individual frames determined to be critical, the overall effect on the total power output of the transmitter is small. Methods other than increasing the transmit power output of a critical frame for protecting such a critical frame can also be used. Examples of such are using a more robust method of channel coding incorporating new methods of bit interleaving.

Figure 2:
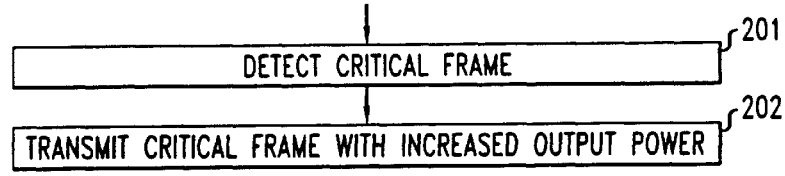
FIG. 2 is a flow chart showing the steps of the present invention.

FIG. 2 illustrates the steps of the present invention. At step 201 a frame is identified as being critical before it is transmitted. At step 202, that critical frame is transmitted using a robust mechanism by, as illustrative examples, increasing the transmit power, or using a more robust channel coding scheme.

In order to identify a frame as being critical, an algorithm is implemented at the speech encoder at the transmitter at the base station and at the mobile unit. The algorithm identifies the critical frames whether they are at the beginning of a spoken word, within a spoken word, or at the end of a spoken word. An extra bit, called a "critical bit" is associated with each full rate frame to indicate that frame as being critical. This critical bit is set for each frame that is identified as being critical, and is reset for the non critical frames. In the preferred embodiment described herein, a frame is identified as being critical by comparing the parameters of the current frame with the corresponding parameters of a previous frame. Specifically, a weighted sum of the differences between the frame parameters of a current frame and those same parameters in a previous frame is formed. A value $\Delta$ is thus calculated as follows:

$$\Delta = W1\|LPC(n)-LPC(n-1)\|+W2\|L(n)-L(n-1)\|+W3\|b(n)-b(n-1)\|+W4\|G(n)-G(n-1)\| \qquad (1)$$

where $\|x\|$ represents the absolute value of x and where n: references the parameters of the current frame;

n−1: references the parameters of the previous frame;

LPC, L, b, G: are the frame parameters that represent each frame; and

W1, W2, W3, W4 are weighting coefficients for the differences in the LPC, the L, the b, and the G frame parameters, respectively, that are associated with current frame and the previous frame.

Once $\Delta$ is calculated, it is compared with $\Delta_{threshold}$. If $\Delta > \Delta_{threshold}$, then the difference between the current frame and the previous frame is so great that the current frame is classified as a critical frame. Thus, as aforedescribed, should that frame be erased, the receiver would be unable to extrapolate the frame parameters of the current frame from the previous frame with a audibly satisfactory degree of accuracy. Thus, once a current frame is determined to be critical, the critical bit for that critical frame is set. If $\Delta <= \Delta_{threshold}$, then the current frame is a non-critical frame and the critical bit is reset.

The weighting coefficients W1, W2, W3 and W4 are normalized to range between 0 and 1. They are related to each other and can be selected as a set using an iterative method as follows.

1. The set (W1, W2, W3, W4) is initialized at (0.5, 0.5, 0.5, 0.5).

2. $\Delta_{threshold}$ is set to 1 for a normalized set of weighting coefficients between 0 and 1.

3. Using a set of fanatically balanced speech signals (speech which includes all frequency components from 0 kHz to 4 kHz), as for example speech sentences by five female and five male speakers, the CELP encoder is used to encode these speech signals to produce the encoded frames, where X is the resultant number of encoded frames.

4. Using the algorithm of equation (1), the critical frames are identified using the initial values of (W1, W2, W3, W4) and $\Delta_{threshold}$=1. Y is the resultant total number of critical frames.

5. Assuming a 3% frame error rate, which is the FER at which the majority of users perceive a degradation in the received voice quality, 0.03X frames are then erased from the X-Y non-critical frames. A channel model for the CDMA system is used to identify the 0.03X erased frames 6. The CELP decoder is then used to decode the entire X frames, after the erasing process, to produce an output that is the encoded/decoded version of the speech signal.

7. The voice quality of the output speech from the decoder is then subjectively evaluated.

8. Steps 1–7 are then repeated with different values of the weighting coefficients, by changing one weighting coefficient at a time as the other three remain constant.

The set of weights (W1, W2, W3, W4) that produces the highest voice quality is the one used in the critical frame identification algorithm of equation (1).

Figure 3:
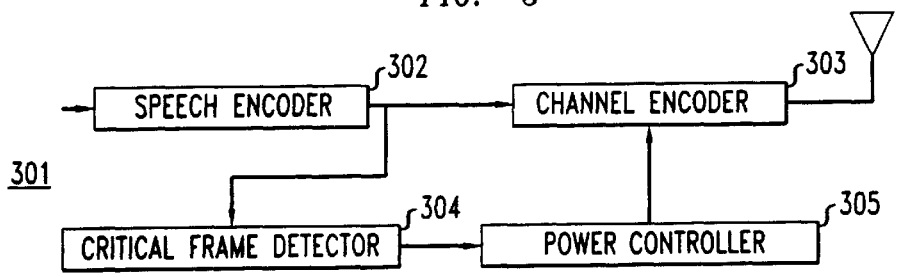
FIG. 3 is a block diagram of a CDMA base station transmitter in accordance with the present invention.

With reference to FIG. 3, a block diagram is shown of a transmitter 301 in a base station of a CDMA system in accordance with the present invention. An input stream of PCM coded speech samples is inputted to a speech encoder 302. As does the speech encoder 103 in FIG. 1, speech encoder 302 formats the PCM stream into 20 ms frames and compresses the input data using a variable rate CELP coding algorithm. During active speech periods, speech encoder 302 produces full rate frames. During silent periods, speech encoder 302 produces ⅛ rate frames. During transition periods between the talking periods and the silent periods, speech encoder 302 produces ½ or ¼ rate frames. For every 20 ms PCM frame input, speech encoder 302 produces an encoded frame consisting of a set of output parameters. An encoded full rate frame includes the aforedescribed linear predicative coding (LPC), pitch lag (L), pitch gain (b); codebook gain (G), and codebook index (I) parameters. These frame parameters that are outputted by speech encoder 302 for each frame are inputted to both a channel encoder 303 and a critical frame detector 304. Critical frame detector 304, forms the weighted sum of the differences between the frame parameters of the current frame and the corresponding frame parameters of a previous frame. In the preferred embodiment, the previous frame is the frame that immediately precedes the current frame. Using the algorithm of equation (1) above, critical frame detector 304 computes $\Delta$ and compares it with $\Delta_{threshold}$, the latter being normalized to 1, as described hereinabove. If the current frame is determined by critical frame detector 304 to be a critical frame, the critical bit is set in the bit stream and the bit stream with the critical bit set is inputted to a power controller 305.

The frame-formatted output of speech encoder 302 is inputted to a channel encoder 303 which, as does channel encoder 104 in FIG. 1, converts the baseband output of speech encoder 302 to a radio frequency signal using CDMA technology. The output of channel encoder 303 is transmitted by antenna 306. The output power of the signal transmitted by channel encoder 303 is controlled by power controller 305. As per the prior art transmitter, power controller 305 controls the output power of the transmitted signal as a function of both whether the transmitted frame is a full rate or sub-rate frame, and the frame error rate statistics. In accordance with the preferred embodiment of the present invention, however, power controller 305 also controls the power output of the channel encoder, on a frame-by-frame basis, as a function of whether each is frame is or is not determined to be a critical frame. Thus, when the critical bit in the bit stream outputted by critical frame detector 304 is detected by power controller 305 as being set, power controller 305 increases the transmit power output of channel encoder 303 for that frame and decreases it to its normal power output level for each frame in which the critical bit is reset.

Figure 4:
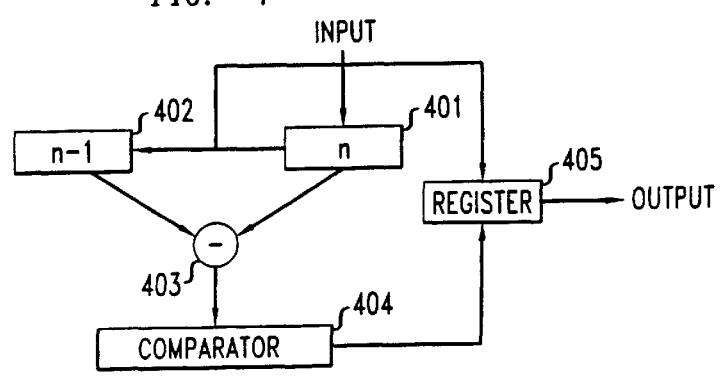
FIG. 4 is a block diagram of a critical frame detector in accordance with the present invention.

FIG. 4 is a block diagram of the critical frame detector 304 in FIG. 3. A frame output of the speech encoder 302, consisting of the frame parameters of the current frame, is inputted to a buffer 401, which stores the current frame (n) and compares it with the frame parameters of the previous frame (n−1) stored in a buffer 402. A weighted sum is formed of the differences between the frame parameters of the current frame and those of the previous frame by subtractor 403, to produce a $\Delta$, which is compared to $\Delta_{theshold}$ by comparator 404. As the next new current frame is inputted to buffer 401, the last current frame is shifted into buffer 402 and the just determined output set or reset bit of comparator 404 is appended to the frame output of buffer 401 by register 405 to form the input to power controller 305.

Although described in connection with a transmitter in a base station, the present invention can be used in a similar manner to that described above, in a transmitter in a mobile unit. Further, the present invention could be used in a TDMA system as well as the described CDMA system, and other types of wireless radio systems known now or which may be developed in the future. Furthermore, as previously noted, other methods for improving the robustness of those frames determined to be critical can also be used as, for example, using a more robust channel coding algorithm for each such critical frame.

Although described in connection hereinabove with improving the speech quality of a signal transmitted over wireless facilities, the present invention could also be applied to improving the transmission of any digital signal representing speech, video, or data, in which the loss of certain frames will have a larger impact than others on the quality of the received signal.

The above-described embodiments are illustrative of the principles of the present invention. Other embodiments could be devised by those skilled in the art without departing from the spirit and scope of the present invention.

What is claimed is:

1. A method for transmitting a digital signal that is arranged in a sequence of frames to a receiver over a transmission medium, the method comprising the steps of:

on a frame-by-frame basis, determining before being transmitted whether a current frame as a whole in the sequence of frames is a critical frame or a non-critical frame by comparing the current frame with at least one previous frame in the sequence of frames;

if the current frame is determined to be a non-critical frame, transmitting the entire non-critical current frame as a whole in a first manner; and if the current frame is determined to be a critical frame, transmitting the entire critical current frame as a whole in a second manner that is more robust than the first manner, the second manner being such that there is less of a likelihood as compared to the first manner that the receiver will determine that the current frame is an erased frame.

2. The method of claim 1 wherein the step of determining whether the current frame is a critical or non-critical frame comprises the steps of:
   determining the differences between a plurality of values associated with the current frame and a corresponding plurality of values associated with the at least one previous frame;
   forming a weighted sum of the differences; and
   comparing the weighted sum with a predetermined threshold.

3. The method of claim 2 wherein the current frame is determined to be a critical frame if the step of comparing indicates that the weighted sum is greater than the predetermined threshold.

4. The method of claim 2 wherein the at least one previous frame is the frame immediately preceding the current frame.

5. The method of claim 1 wherein if the current frame is determined to be a critical frame, it is transmitted at a higher power level than a non-critical frame is transmitted.

6. The method of claim 1 wherein if the current frame is determined to be a critical frame, it is transmitted with a channel coding algorithm that is more robust than the coding algorithm used to transmit a non-critical frame.

7. The method of claim 6 wherein the more robust channel coding algorithm incorporates bit interleaving.

8. A method of transmitting a digital speech signal that is arranged in a sequence of frames over a wireless transmission medium to a receiver from a transmitter, the method comprising the steps of:
   on a frame-by-frame basis, determining at the transmitter before being transmitted whether a current frame as a whole in the sequence of frames is a critical frame or a non-critical frame by comparing the current frame with at least one previous frame in the sequence of frames;
   if the current frame is determined to be a non-critical frame, transmitting the entire non-critical frame as a whole over the wireless transmission medium in a first manner; and
   if the current frame is determined to be a critical frame, transmitting the entire critical current frame as a whole over the wireless transmission medium in a second manner that is more robust than the first manner, the second manner being such that there is less of a likelihood, as compared to the first manner, that the receiver will determine that the current frame is an erased frame.

9. The method of claim 8 wherein the transmitter is a code division multiple access (CDMA) transmitter and the step of determining whether the current frame is a critical or a non-critical frame comprises the steps of:
   determining the differences between a plurality of frame parameters that represent a compression-coded version of the current frame and a corresponding plurality of frame parameters that represent a compression-coded version of the at least one previous frame; and
   forming a weighted sum of the differences between the plurality of the frame parameters of the current frame and the corresponding plurality of the frame parameters of the at least one previous frame; and
   comparing the weighted sum with a predetermined threshold.

10. The method of claim 9 wherein the current frame is determined to be a critical frame if the step of comparing indicates that the weighted sum is greater than the predetermined threshold.

11. The method of claim 9 wherein the at least one previous frame is the frame immediately preceding the current frame.

12. The method of claim 8 wherein if the current frame is determined to be a critical frame, it is transmitted by the transmitter to the receiver over the wireless transmission medium at a higher power level than a non-critical frame is transmitted.

13. The method of claim 8 wherein if the current frame is determined to be a critical frame, it is transmitted by the transmitter to the receiver over the wireless transmission medium with a channel coding algorithm that is more robust than the coding algorithm used to transmit a non-critical frame.

14. The method of claim 13 wherein the more robust channel coding algorithm incorporates bit interleaving.

15. The method of claim 8 wherein the transmitter is within a mobile unit.

16. The method of claim 8 wherein the transmitter is within a base station.

17. A transmitter for transmitting a digital signal that is arranged in a sequence of frames to a receiver over a transmission medium comprising:
   means for determining before it is transmitted whether a current frame as a whole in the sequence of frames is a critical frame or a non-critical frame on a frame-by-frame by comparing the current frame with at least one previous frame in the sequence of frames; and
   means for transmitting the entire current frame as a whole in a manner according to whether it is determined to be a critical or a non-critical frame, an entire non-critical frame being transmitted as a whole in a first manner and an entire critical frame being transmitted as a whole in a second manner that is more robust than the first manner, the second manner being such that there is less of a likelihood as compared to the first manner that the receiver will determine that the current frame is an erased frame.

18. The transmitter of claim 17 wherein the means for determining whether the current frame is a critical or a non-critical frame comprises:
   means for determining the differences between a plurality of values associated with the current frame and a corresponding plurality of values associated with the at least one previous frame;
   means for forming a weighted sum of the differences; and
   means for comparing the weighted sum with a predetermined threshold.

19. The transmitter of claim 18 wherein the current frame is determined to be a critical frame if the means for weighted sum indicates that the weighted sum is greater than the predetermined threshold.

20. The transmitter of claim 18 wherein the at least one previous frame is the frame immediately preceding the current frame.

21. The transmitter of claim 17 further comprising a power controller, wherein if said means for determining determines that the current frame is a critical frame, then said power controller adjusts the output power of said-transmitting means to transmit the current frame to the receiver at a higher output power level than a non-critical frame is transmitted.

22. The transmitter of claim 17 wherein if said means for determining determines that the current frame is a critical frame, then said means for transmitting transmits the current frame to the receiver using a channel coding algorithm that is more robust than the coding algorithm used to transmit a non-critical frame.

23. The transmitter of claim 22 wherein the more robust channel coding algorithm incorporates bit interleaving.

24. A transmitter for transmitting a digital speech signal that is arranged in a sequence of frames over a wireless transmission medium to a receiver comprising:

means for determining before it is transmitted whether a current frame as a whole in the sequence of frames is a critical frame or a non-critical frame on a frame-by-frame by comparing the current frame with at least one previous frame in the sequence of frames; and means for transmitting the entire current frame as a whole in a manner determined according to whether the current frame is-determined to be a critical or a non-critical frame, an entire non-critical frame being transmitted as a whole in a first manner and an entire critical frame being transmitted as a whole in a second manner that is more robust than the first manner, the second manner being such that there is less of a likelihood as compared to the first manner that the receiver will determine that the current frame is an erased frame.

25. The transmitter of claim 24 wherein the means for transmitting transmits each frame over the wireless transmission medium using code division multiple access technology, and the means for determining whether the current frame is a critical or a non-critical frame comprises:

means for determining differences between a plurality of frame parameters that represent a compression-coded version of the current frame and a corresponding plurality of frame parameters that represent a compression-coded version of the at least one previous frame;

means for forming a weighted sum of the differences between the plurality of frame parameters that represent the current frame and the corresponding frame parameters that represent the at least one previous frame; and means for comparing the weighted sum with a predetermined threshold.

26. The transmitter of claim 25 wherein the current frame is determined to be a critical frame if the means for comparing the weighted sum indicates that the weighted sum is greater than the predetermined threshold.

27. The transmitter of claim 25 wherein the at least one previous frame is the frame immediately preceding the current frame.

28. The transmitter of claim 24 further comprising a power controller, wherein if said means for determining determines that the current frame is a critical frame, then the power controller adjusts the output power of said transmitting means to transmit the current frame to the receiver over the wireless transmission medium at a higher output power level than a non-critical frame is transmitted.

29. The transmitter of claim 24 wherein the means for transmitting the current frame transmits to the receiver over the wireless transmission medium a current frame that is determined to be a critical frame using a channel coding algorithm that is more robust than the coding algorithm used to transmit a non-critical frame.

30. The transmitter of claim 29 wherein the more robust channel coding algorithm incorporates bit interleaving.

31. The transmitter of claim 24 wherein the transmitter is within a mobile unit.

32. The transmitter of claim 24 wherein the transmitter is within a base station.

* * * * *